US012800997B2

(12) United States Patent
Watanabe

(10) Patent No.: US 12,800,997 B2
(45) Date of Patent: Nov. 17, 2026

(54) ELECTRONIC APPARATUS AND ACCESSORY

(71) Applicant: CANON KABUSHIKI KAISHA, Tokyo (JP)

(72) Inventor: Shinsaku Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 18/664,392

(22) Filed: May 15, 2024

(65) Prior Publication Data

US 2024/0411210 A1 Dec. 12, 2024

(30) Foreign Application Priority Data

Jun. 12, 2023 (JP) ................................ 2023-096310

(51) Int. Cl.
*G03B 17/56* (2021.01)

(52) U.S. Cl.
CPC .................................... *G03B 17/56* (2013.01)

(58) Field of Classification Search
CPC .... G03B 17/566; G03B 17/14; H01R 13/625; H01R 13/71
USPC .................................................. 396/532, 541
See application file for complete search history.

(56) References Cited

U.S. PATENT DOCUMENTS 3,762,295 A * 10/1973 Kitai ...................... G03B 17/14 396/529
4,739,356 A * 4/1988 Ogura .................... G03B 17/14 396/532
6,893,297 B2 * 5/2005 Chen ...................... H01R 31/06 439/680
11,212,430 B2 * 12/2021 Kawai .................. H04N 23/687
11,489,297 B2 * 11/2022 Houir Alami ...... H01R 13/7036

FOREIGN PATENT DOCUMENTS

JP 2007101656 A 4/2007

* cited by examiner

*Primary Examiner* — Leon W Rhodes, Jr.
(74) *Attorney, Agent, or Firm* — Cowan, Liebowitz & Latman, P.C.

(57) ABSTRACT

An accessory that is attached to and detachable from an attachment portion provided to an electronic apparatus includes an engagement portion configured to engage the accessory with the attachment portion to hold the accessory in a case where the accessory disposed at a first position relative to the attachment portion is rotated to a second position in a first direction, and a plurality of contacts arranged in the first direction and connectable to corresponding terminals among a plurality of terminals arranged in the first direction and provided to the attachment portion at the second position. An interval angle between adjacent contacts among the plurality of contacts is larger than a rotational angle of the accessory from the first position to the second position.

6 Claims, 13 Drawing Sheets

ELECTRONIC APPARATUS AND ACCESSORY

BACKGROUND

Technical Field

One of the aspects of the embodiments relates to an electronic apparatus and an accessory attachable to and detachable from the electronic apparatus.

Description of Related Art

Methods of signal transmission between an electronic apparatus and an accessory that is attachable to and detachable from the electronic apparatus include a method of forming a signal transmission path by connecting a terminal or contact provided to the accessory to a corresponding terminal provided to the electronic apparatus. Such a signal transmission method often use a holding structure that prevents physical detachment between the electronic apparatus and the accessory to maintain the normal connection state with the accessory even when the electronic apparatus receives an external force such as an impact.

Japanese Patent Laid-Open No. 2007-101656 discloses a holding structure in which holding tab portions (bayonet tabs) provided at the electronic apparatus and the accessory, respectively, are engaged with each other, by rotating the electronic apparatus and the accessory relative to each other in a direction different from a connecting direction of the terminals that are arrayed at regular intervals in a circular arc shape on the electronic apparatus and the accessory.

However, while the electronic apparatus and the accessory are rotated relative to each other as disclosed in Japanese Patent Laid-Open No. 2007-101656, non-corresponding terminals may contact each other to cause malfunction of the electronic apparatus or abrade the terminals.

SUMMARY

An accessory according to one aspect of the disclosure that is attached to and detachable from an attachment portion provided to an electronic apparatus includes an engagement portion configured to engage the accessory with the attachment portion to hold the accessory in a case where the accessory disposed at a first position relative to the attachment portion is rotated to a second position in a first direction, and a plurality of contacts arranged in the first direction and connectable to corresponding terminals among a plurality of terminals arranged in the first direction and provided to the attachment portion at the second position. An interval angle between adjacent contacts among the plurality of contacts is larger than a rotational angle of the accessory from the first position to the second position.

An electronic apparatus according to another aspect of the disclosure includes an attachment portion attachable to and detachable from an accessory, a holder configured to engage the accessory with the attachment portion to hold the accessory in a case where the accessory disposed at a first position relative to the attachment portion is rotated to a second position in a first direction, and a plurality of terminals arranged in the first direction and connectable to corresponding contacts among the plurality of contacts at the second position. An interval angle between adjacent terminals among the plurality of terminals is larger than a rotational angle of the accessory from the first position to the second position.

Further features of various embodiments of the disclosure will become apparent from the following description of embodiments with reference to the attached drawings.

DESCRIPTION OF THE EMBODIMENTS

Examples of the present disclosure will be described below with reference to the accompanying drawings.

Example 1

Figure 1A:
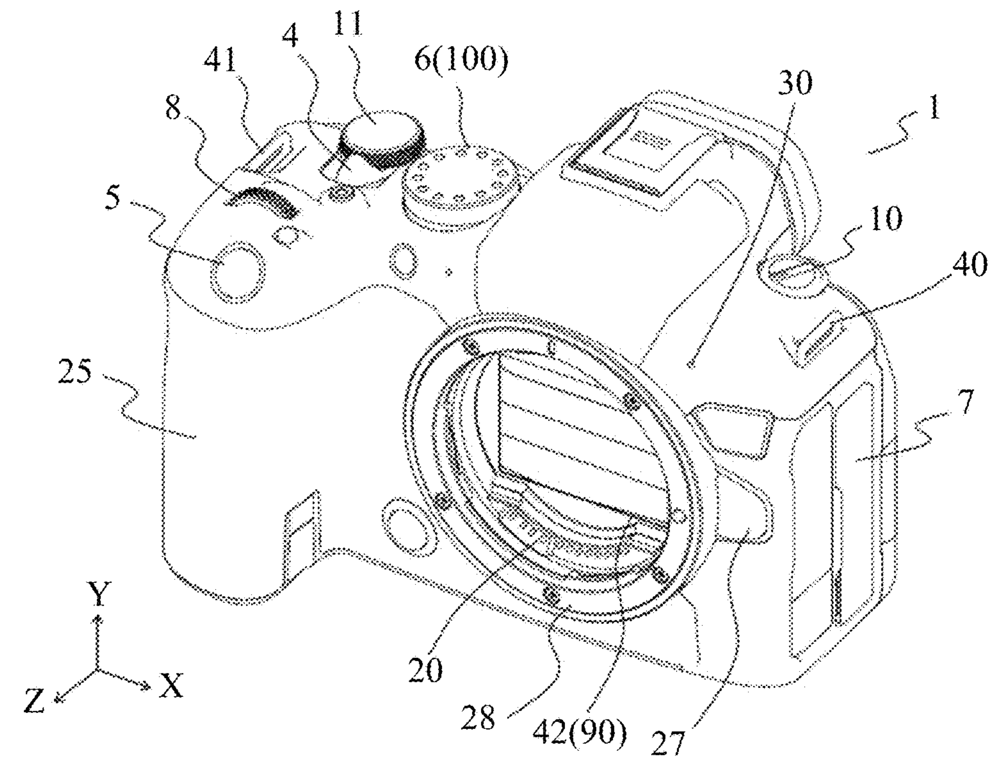
FIGS. 1A and 1B illustrate an image pickup apparatus according to Example 1.
Figure 1B:
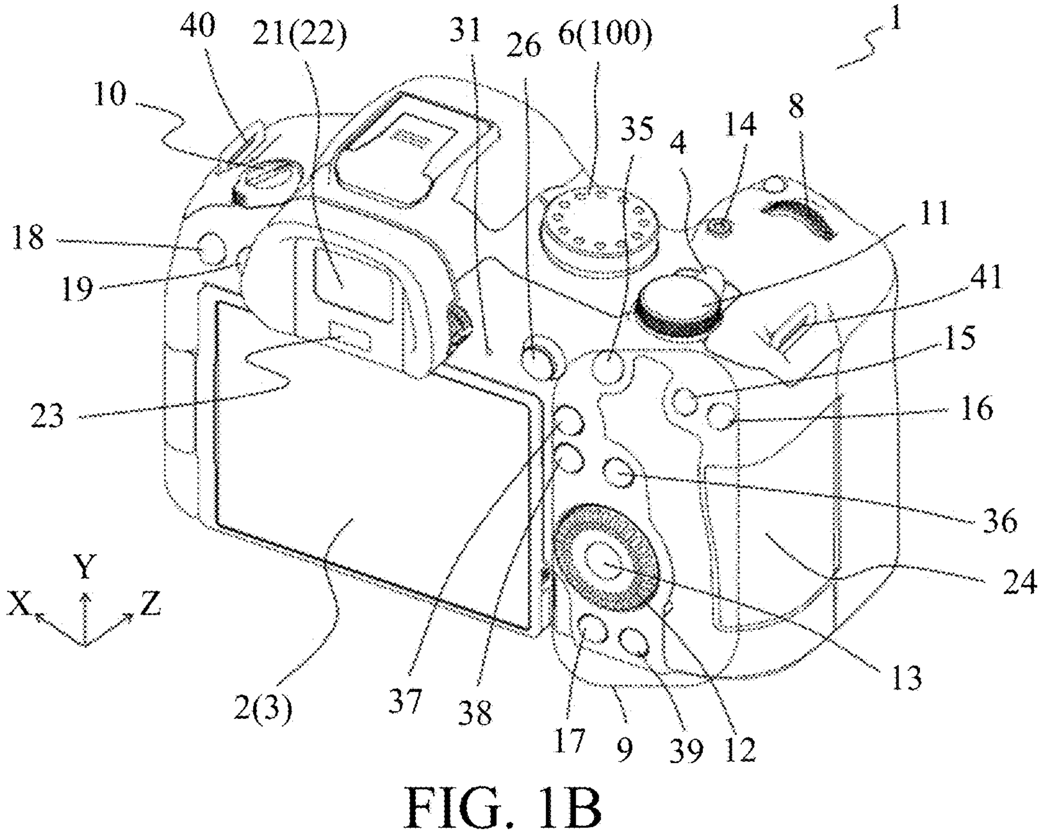

FIG. 1A illustrates an image pickup apparatus 1 as an electronic apparatus according to Example 1 when viewed from diagonally in front, and FIG. 1B illustrates the image pickup apparatus 1 when viewed from diagonally behind. A display unit 2 displays images and various types of information. A touch panel 3 can detect a touch operation on a display surface (operation surface) of the display unit 2.

A power switch 4 is operable by a user to power on and off the image pickup apparatus 1. A shutter button 5 is operable by the user to instruct imaging. A mode dial 6 is operable by the user to switch between various modes. The mode dial 6 is an operation apparatus as an accessory that is attached to and detachable from the image pickup apparatus 1, and details thereof will be described below.

A terminal cover 7 is provided to protect an unillustrated connector that is connected to a cable or the like connecting an external instrument and the image pickup apparatus 1. A main electronic dial 8 is rotationally operable by the user to change setting values such as shutter speed and an aperture value (F-number). A switching switch 10 is operable by the user to switch between a still image recording mode and a moving image recording mode.

A sub electronic dial 11 is operable by the user to move a selection frame such as an AF frame, to feed a display image, and the like.

An operation unit 9 is constituted on the back surface side of the image pickup apparatus 1. The operation unit 9 includes a plurality of press buttons and an operation dial 12. The operation dial 12 is rotationally operated by the user to change setting values such as the shutter speed and the aperture value. A set button 13 is operable by the user to, for example, determine a selection item. A selection member 26 is a directional pad (four-direction key), upper, lower, left, and right parts of which can be pressed in, and is operable by the user to select a menu item for performing various types of setting.

A motion image button 14 is operable by the user to instruct start and stop of moving image capturing (recording). An AE lock button 15 is operable by the user to fix an exposure value in an imaging standby state. An AF position switching button 16 is operable by the user to select an AF frame. An AF-on button 35 is operable by the user to focus on an AF frame selected in the imaging standby state. An enlargement button 37 is operable by the user to turn on and off an enlargement mode during display of a live-view (LV) image in an imaging mode. The LV image can be enlarged and reduced by operating the main electronic dial 8 after the enlargement mode is turned on. In a playback mode, the main electronic dial 8 functions as an enlargement button for enlarging a played-back image.

An information button 38 is operable by the user to play back and display recorded image data in the playback mode. A playback button 17 is operable by the user to switch the imaging mode and the playback mode. When the playback button 17 is operated during the imaging mode, the mode transitions to the playback mode so that latest image data among image data recorded in an unillustrated recording medium can be displayed on the display unit 2. A delete button 39 is operable by the user to delete recorded image data selected in the playback mode.

A menu button 19 is operable by the user to display, on the display unit 2, a menu screen for various types of setting. The user can intuitively perform various types of setting by operating the operation dial 12 or the set button 13 while viewing the menu screen displayed on the display unit 2. A rating button 18 is operable by the user to apply flag information to recorded image data selected in the playback mode.

A microphone hole 30 and a speaker hole 31 are provided in the image pickup apparatus 1. An unillustrated microphone disposed inside the microphone hole 30 is used to record sound data during moving image capturing. An unillustrated speaker disposed inside the speaker hole 31 is used to play back recorded sound data and sound data built in the image pickup apparatus 1.

An eyepiece unit 21 is a part that the user viewing an electronic viewfinder (EVF) 22 peeps into. The user can view a video displayed on the EVF 22 provided inside through the eyepiece unit 21. An eye proximity detector 23 detects whether the user is peeping in (an eye is close to) the eyepiece unit 21. A lid 24 is provided to close a slot in which a recording medium is stored.

A grip portion 25 has a shape that can be easily gripped with the right hand when the user grasps the image pickup apparatus 1. The shutter button 5 and the main electronic dial 8 are disposed at positions where the shutter button 5 and the main electronic dial 8 are operable with the forefinger of the right hand in a state in which the grip portion 25 is gripped with the little, ring, and middle fingers of the right hand to hold the image pickup apparatus 1. In addition, the sub electronic dial 11 and the selection member 26 are disposed at positions where the sub electronic dial 11 and the selection member 26 are operable with the thumb of the right hand in the same state.

Figure 2:
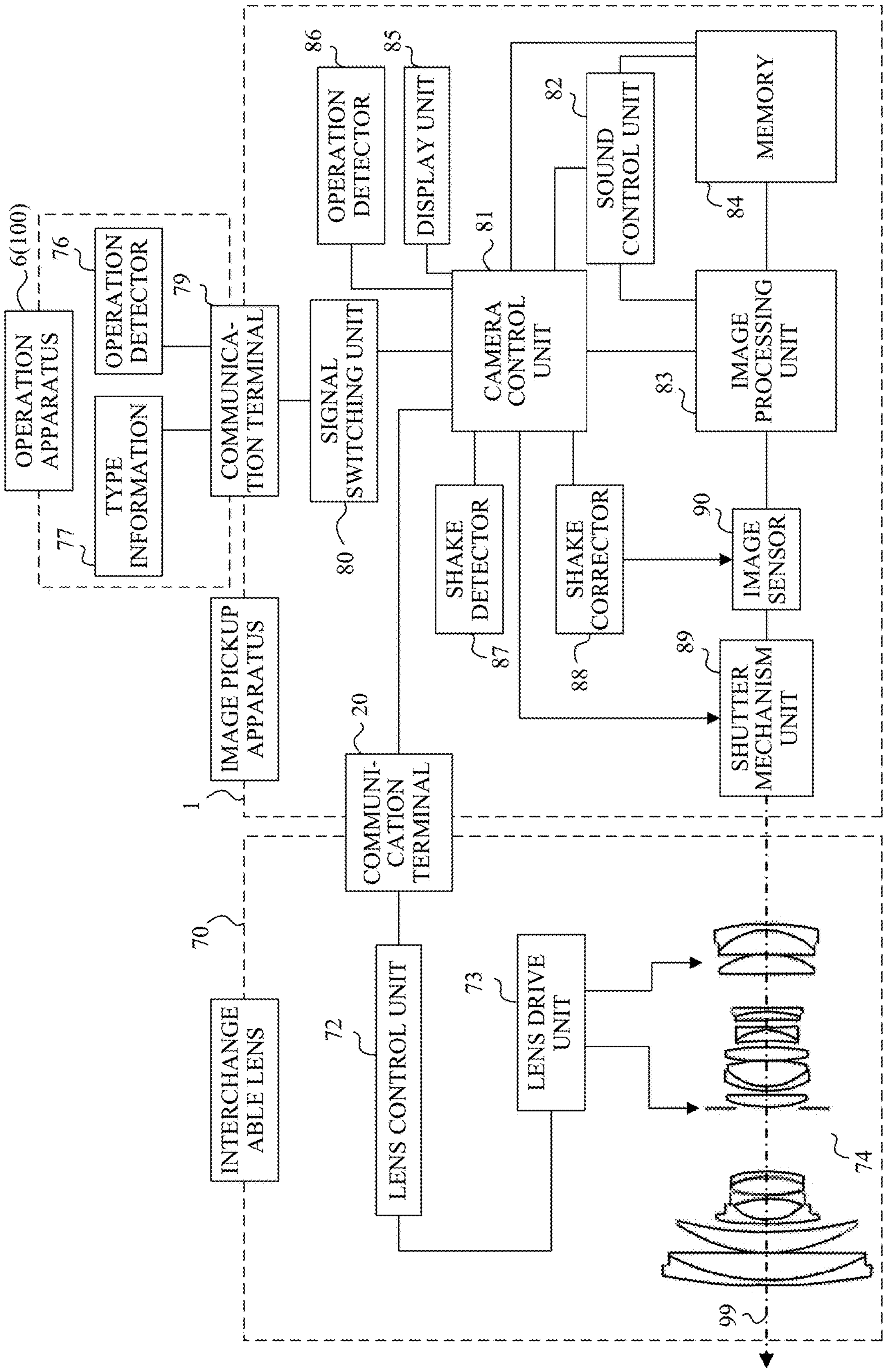
FIG. 2 is a block diagram illustrating the configuration of the image pickup apparatus according to Example 1.

An image sensor 90 is a photoelectric conversion element such as a CMOS sensor and photoelectrically converts an object image formed through an unillustrated interchangeable lens (70 in FIG. 2). A lens mount portion 28 is a part through which a lens is attached to and detachable from the image pickup apparatus 1. Terminals 20 for enabling communication between the image pickup apparatus 1 and the lens are provided inside the lens mount portion 28.

A lock button 27 is disposed near the outer periphery of the lens mount portion 28 and operable by the user to enable lens removal by canceling a holding lock function that functions by attaching the lens apparatus to the image pickup apparatus 1.

Straps for hanging on the neck or the like when the image pickup apparatus 1 is carried around can be attached through strap insertion portions 40 and 41.

FIG. 2 illustrates the electric configurations of the image pickup apparatus 1 and the interchangeable lens 70. The interchangeable lens 70 includes an imaging optical system 74 that includes a plurality of lenses and an aperture stop. The interchangeable lens 70 includes a lens control unit 72 and a lens drive unit 73. The lens control unit 72 controls the entire operation of the interchangeable lens 70. The lens control unit 72 can communicate with a camera control unit 81 in the image pickup apparatus 1 through the terminals 20. The lens drive unit 73 drives a focus lens, a zoom lens, the aperture stop, and the like in the imaging optical system 74 in accordance with an instruction from the lens control unit 72.

The image pickup apparatus 1 includes the camera control unit 81 and the image sensor 90. The camera control unit 81 controls the entire operation of the image pickup apparatus 1 and the interchangeable lens 70. The image sensor 90 receives light (object image) from an object through the imaging optical system 74 and a shutter mechanism unit 89, photoelectrically converts the object image, and outputs an imaging signal as an electric signal. An image processing unit 83 generates image data by performing image processing such as A/D conversion, white balance adjustment, gamma correction, and interpolation calculation for the imaging signal output from the image sensor 90.

A sound control unit 82 outputs sound data acquired through the above-described microphone to the image processing unit 83. The image processing unit 83 combines the sound data with the image data and outputs the combined data to a memory 84. The memory 84 includes a nonvolatile memory and stores various types of data such as image data and sound data. The image data output from the image processing unit 83 is displayed on the display unit 2.

A camera control unit 81 performs storage processing of data in the memory 84 and processing of outputting data read from the memory 84 to a display unit 85 and presenting the data to the user. The display unit 85 in FIG. 2 corresponds to the display unit 2 and an extra-finder display unit 4 in FIGS. 1A and 1B.

A shake detector 87 detects camera shake such as manual shake, using a gyro sensor or the like. More specifically, the shake detector 87 detects rotational shake in the pitch direction, the yaw direction, and the roll direction. A shake detection signal output from the shake detector 87 is input to the camera control unit 81.

The camera control unit 81 controls the image pickup apparatus 1 and the interchangeable lens 70 in accordance with an operation signal output from an operation detector 86 having detected an operation of any of the operation member (such as the press button and dial). The camera control unit 81 includes a CPU and an MPU and performs various types of processing in accordance with computer programs. For example, the camera control unit 81 acquires information of a focus evaluation value and a luminance value from an imaging signal output from the image sensor 90 or image data, and performs optical adjustment processing for the imaging optical system 74 based on the information.

A shake corrector 88 performs image stabilization by moving (shifting) the image sensor 90 in a plane orthogonal to an optical axis 99 in accordance with a control command from the camera control unit 81 that has received the shake detection signal from the shake detector 87. The shutter mechanism unit 89 controls the time of exposure of the image sensor 90 by moving a shutter curtain 42 illustrated in FIG. 1A.

The mode dial 6 is an operation apparatus 100 that can be attached to and detachable from the image pickup apparatus 1 (can be interchanged). The operation apparatus 100 communicates with the image pickup apparatus 1 through a communication terminal 79. The operation apparatus 100 includes an operation detector 76 configured to detect an operation of the operation apparatus 100 by the user, and outputs an operation signal from the operation detector 76 to the image pickup apparatus 1. The operation apparatus 100 further includes a plurality of types of components, in addition to the mode dial 6, such as an exposure dial and a sub dial. The image pickup apparatus 1 performs mode switching operation, exposure change operation, and sub dial corresponding operation in accordance with the type of the operation apparatus 100 attached. More specifically, in a case where the operation apparatus 100 is attached to the image pickup apparatus 1, type information 77 indicating the type is transmitted from the operation apparatus 100 to a signal switching unit 80 through the communication terminal 79. After the type of the attached operation apparatus 100 is determined based on the type information 77, the signal switching unit 80 inputs, to a predetermined terminal of the camera control unit 81, the operation signal input from the operation detector 76 through the communication terminal 79.

Figure 3A:
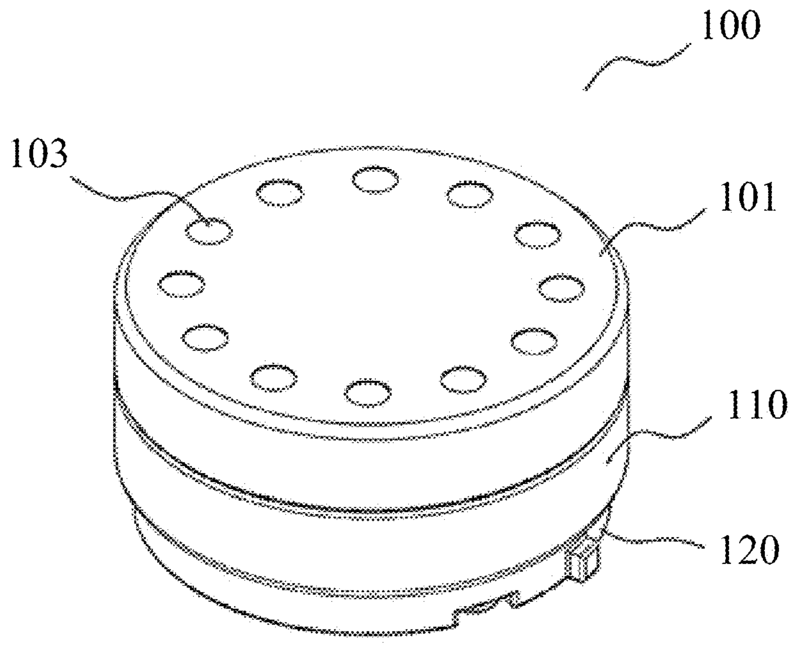
FIGS. 3A and 3B are perspective views illustrating an operation apparatus according to Example 1.
Figure 3B:
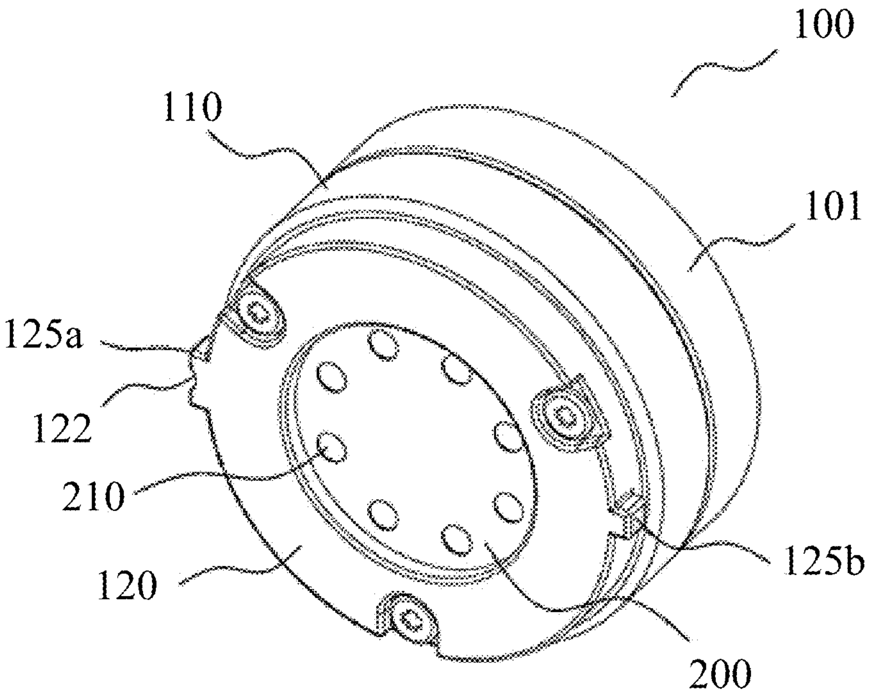

Next, details of the operation apparatus 100 (the mode dial 6) will be described below. FIGS. 3A and 3B illustrate the appearance of the operation apparatus 100 when viewed from diagonally above and diagonally behind, respectively.

The operation apparatus 100 includes an upper cover member 110 and a lower cover member 120 constituting a fixed portion, and a dial member 101 as a rotational operation member that is rotatable relative to the fixed portion. A plurality of indicators 103 corresponding to a plurality of imaging modes are provided on the top surface of the dial member 101. In a case where the dial member 101 is rotationally operated to align one of the indicators 103 with an indicator provided to the image pickup apparatus 1, an imaging mode in accordance with the indicator 103 is set to the image pickup apparatus 1.

A circuit board 200 is provided on the bottom surface side of the operation apparatus 100. A plurality of contact lands 210 are formed at the circuit board 200 and exposed at the lower cover member 120.

Convex portions 125*a* and 125*b* as engagement portions are provided at two places on facing sides on the outer circumference of the lower cover member 120. The convex portion 125*a* is formed wider than the convex portion 125*b* in the circumferential direction of the lower cover member 120. A click groove portion 122 is formed at the convex portion 125*a*.

Figure 4A:
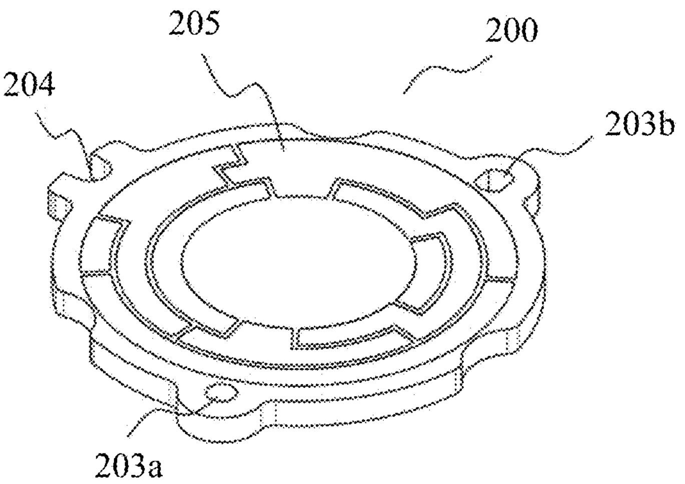
FIGS. 4A, 4B, and 4C illustrate a circuit board of the operation apparatus according to Example 1.
Figure 4B:
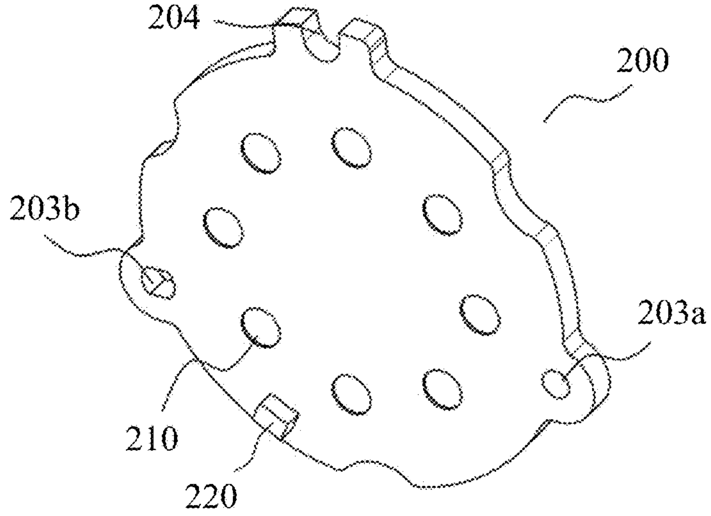
Figure 4C:
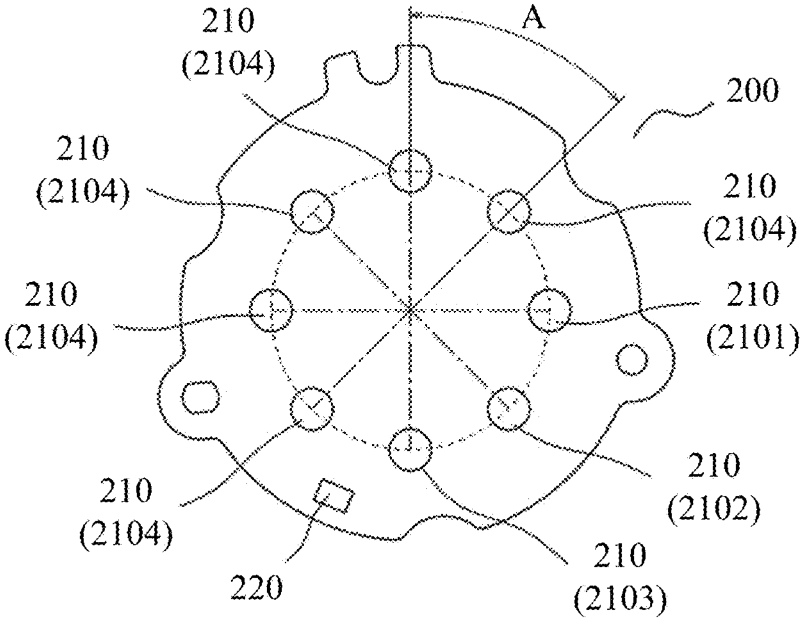

FIGS. 4A and 4B illustrate the circuit board 200 when viewed from diagonally above (on the dial member side) and diagonally behind (on the lower cover member side), respectively. FIG. 4C illustrates the bottom surface of the circuit board 200.

The circuit board 200 is a plate wiring substrate and has a structure in which a copper foil pattern is formed on an insulating glass epoxy base material and an insulating resist is provided on the copper foil pattern. Gold plating processing is provided on the copper foil pattern exposed through openings provided at the insulating resist.

A dial pattern 205 as the exposed copper foil pattern is formed at the top surface of the circuit board 200. Similarly, the plurality of contact lands 210 as the copper foil pattern are exposed through the openings of the insulating resist at the bottom surface of the circuit board 200. Gray code is constituted by combination of contact between a plurality of connection portions of the dial pattern 205 and two slide portions (to be described below) of a terminal brush 130 to be described below. A plurality of contact portions of the dial pattern 205 are electrically connected in a one-to-one correspondence to a plurality of corresponding contact lands 210.

The plurality of contact lands 210 are circumferentially arranged at regular intervals on the bottom surface of the circuit board 200. The arrangement interval of the plurality of contact lands 210 (interval angle or angle pitch between adjacent contacts) is angle A as illustrated in FIG. 4C. The plurality of contact lands 210 include a ground (GND) (reference voltage) land 2101 as one first contact for grounding, a power land 2102 as one second contact for power supply, one detection signal land 2103, and five operation signal lands 2104. The detection signal land 2103 and the operation signal lands 2104 are third contacts for signal transmissions.

The detection signal land 2103 is a land for signal outputting from an electronic component 220 mounted on the circuit board 200. The electronic component 220 receives drive power supply from the power land 2102 and outputs a signal (in this example, a signal indicating the type information 77) to the detection signal land 2103. The image pickup apparatus 1 receives the signal from the detection signal land 2103 and determines the type of the operation apparatus 100.

Positioning holes 203*a* and 203*b* and a concave portion 204 are provided at an outer peripheral part of the circuit board 200.

Figure 5:
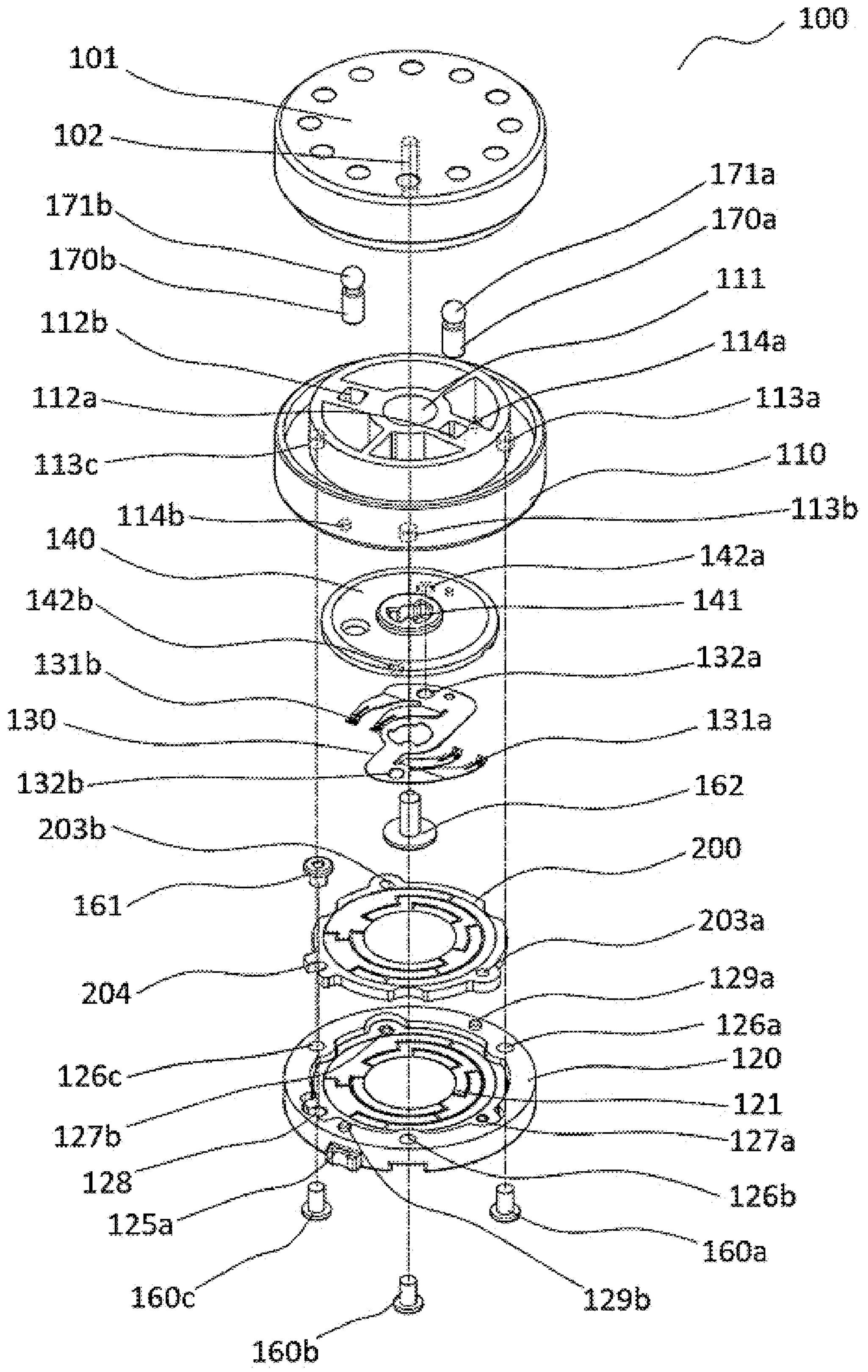
FIG. 5 is an exploded perspective view of the operation apparatus according to Example 1.

FIG. 5 is an exploded diagram illustrating the operation apparatus 100. The dial member 101 is a member molded by resin molding and circular when viewed from above. A screw hole 102 is formed on the lower side of the center of the dial member 101.

The upper cover member 110 is a member molded by resin molding and circular when viewed from above. A hole 111 is provided at the center of the upper cover member 110, and accommodation portions 112*a* and 112*b* are formed around the hole. Compression springs 170*a* and 170*b* are disposed in the accommodation portions 112*a* and 112*b*. The compression springs 170*a* and 170*b* press click balls 171*a* and 171*b* toward a plurality of unillustrated concave portions provided in the circumferential direction at the bottom surface of the dial member 101. A click feeling occurs as the click balls 171*a* and 171*b* move in or out of the concave portions with a rotational operation of the dial member 101.

A rotational member 140 includes caulk portions 142*a* and 142*b*. The terminal brush 130 is formed of a conductive metal. The terminal brush 130 includes slide portions 131*a* and 131*b*. The terminal brush 130 is fixed to the caulk portions 142*a* and 142*b* of the rotational member 140 through holes 132*a* and 132*b* by thermal welding or the like. The rotational member 140 and the terminal brush 130 are fixed in an integrally rotatable manner to the dial member 101 in a case where a screw 162 passing through central parts of the rotational member 140 and the terminal brush 130 is fastened to the screw hole 102 of the dial member 101 through the upper cover member 110. Due to this configuration, the dial member 101, the rotational member 140, and the terminal brush 130 are rotatably held to the upper cover member 110.

The lower cover member 120 is a member molded by resin molding and has an opening portion 121 at its center. The circuit board 200 is positioned relative to the lower cover member 120 in a case where positioning bosses 127*a* and 127*b* formed at the lower cover member 120 are inserted into the positioning holes 203*a* and 203*b* of the circuit board 200. In this case, the circuit board 200 is disposed such that the dial pattern 205 is positioned on the upper side. The circuit board 200 is fixed to the lower cover member 120 in a case where the concave portion 204 and a screw hole 128 provided near the outer periphery of the lower cover member 120 are fastened to each other by a screw 161.

The lower cover member 120 to which the circuit board 200 is fixed is positioned relative to the upper cover member 110 when positioning bosses 129*a* and 129*b* thereof are inserted into positioning holes 114*a* and 114*b* of the upper cover member 110. Screws 160*a*, 160*b*, and 160*c* inserted into holes 126*a*, 126*b*, and 126*c* of the lower cover member 120 are fastened in screw holes 113*a*, 113*b*, and 113*c* of the upper cover member 110.

Due to this configuration, the dial member 101, the rotational member 140, and the terminal brush 130 are rotatably held relative to the upper cover member 110, the lower cover member 120, and the circuit board 200. That is, the slide portions 131*a* and 131*b* of the terminal brush 130 slide on the dial pattern 205 of the circuit board 200 in coordination with rotation of the dial member 101. Then, the combination of contact between the dial pattern 205 and the terminal brush 130 switches, and thereby a rotational operation of the dial member 101 is detected. A signal generated by contact of the dial pattern 205 and the terminal brush 130 is transmitted to the image pickup apparatus 1 through the contact lands 210 and a terminal 185 to be described below. In other words, a signal in accordance with the rotational position of the dial member 101 is transmitted to the image pickup apparatus 1.

Figure 6A:
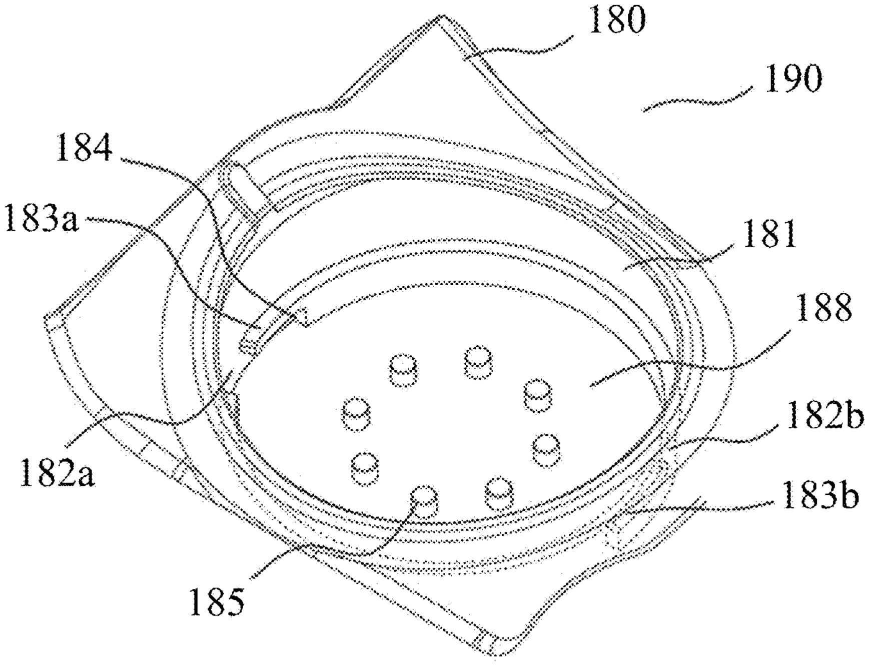
FIGS. 6A and 6B are perspective views illustrating an attachment portion of the image pickup apparatus according to Example 1.
Figure 6B:
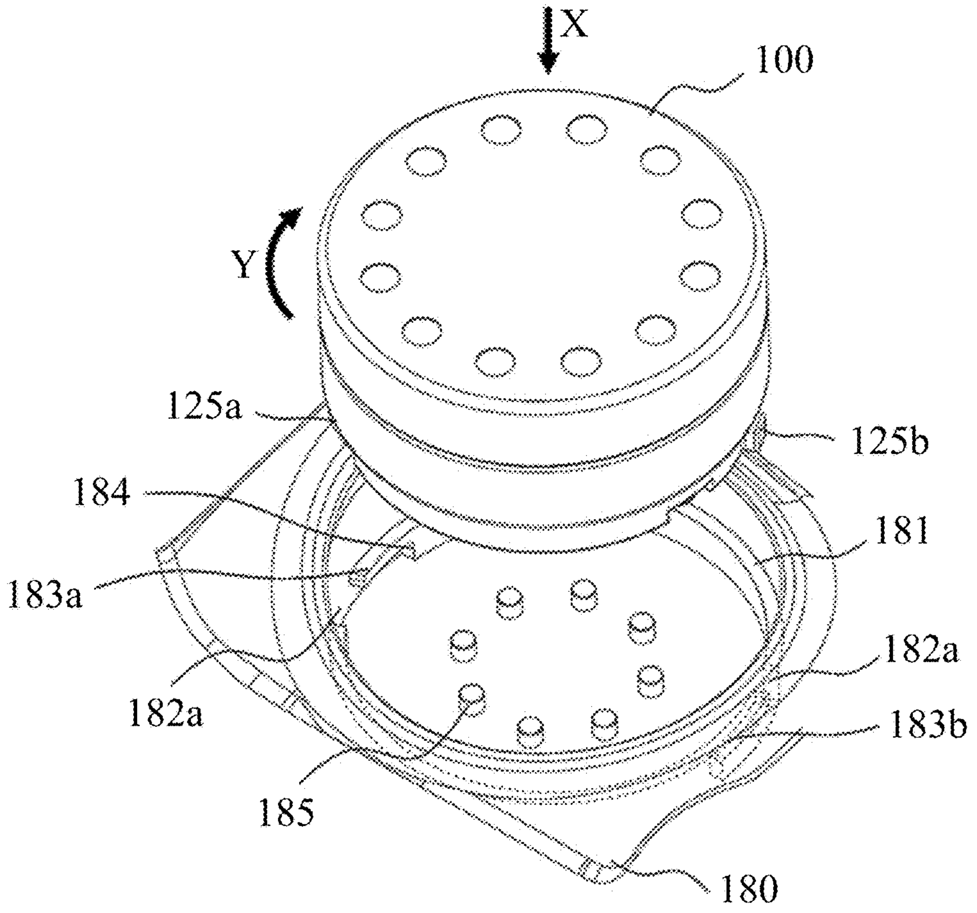

FIG. 6A illustrates an attachment portion 190 that is provided to the image pickup apparatus 1 and to which the operation apparatus 100 is attached. FIG. 6A illustrates the attachment portion 190 when viewed from diagonally above. FIG. 6B illustrates attachment of the operation apparatus 100 to the attachment portion 190.

A top cover 180 is an exterior member on the top surface of the image pickup apparatus 1. A concave portion 181 that is circular when viewed from above is formed at the top cover 180, and the attachment portion 190 is provided in the concave portion 181. A plurality of terminals 185 circumferentially arranged at regular intervals (regular angle pitches) are disposed on a bottom surface 188 of the concave portion 181 (attachment portion 190). The terminals 185 are pressed from the inside of the image pickup apparatus 1 toward the outside by an unillustrated spring. The terminals 185 are pressed by a certain amount toward the inside of the image pickup apparatus 1 by the contact lands 210 of the operation apparatus 100 in a case where the operation apparatus 100 is attached. In other words, the terminals 185 are electrically connected to the contact lands 210 of the operation apparatus 100 while being pressed in a case where the operation apparatus 100 is attached to the attachment portion 190. The terminals 185 are electrically connected to an unillustrated circuit board provided inside the image pickup apparatus 1, and a signal from the operation apparatus 100 is transmitted to the circuit board through the terminals 185.

Rail portions 183*a* and 183*b* as holders extending in the circumferential direction are formed on the side surface of the concave portion 181, and opening portions 182*a* and 182*b* are formed between the rail portions 183*a* and 183*b*. The opening portion 182*a* is formed wider than the opening portion 182*b* in the circumferential direction.

The convex portion 125*a* of the operation apparatus 100 can be inserted into the opening portion 182*a*, and the convex portion 125*b* of the operation apparatus 100 can be inserted into the opening portion 182*b*. The convex portion 125*a* formed wider than the convex portion 125*b* cannot be physically inserted into the opening portion 182*b*. This structure prevents the operation apparatus 100 from being attached to the attachment portion 190 at a phase different from a predetermined attachment phase.

A description will now be given of the attachment of the operation apparatus 100 to the attachment portion 190. The operation apparatus 100 is moved toward the concave portion 181 of the top cover 180 in an arrow X direction in FIG. 6B. Then, the convex portion 125*a* of the operation apparatus 100 is inserted into the opening portion 182*a*, and the convex portion 125*b* is inserted into the opening portion 182*b*. The position of the operation apparatus 100 in this state corresponds to a first position. In addition, the operation apparatus 100 is rotated in the arrow Y direction in FIG. 6B. Thereby, the convex portion 125*a* moves inside the rail portion 183*a* in the circumferential direction, and the convex portion 125*b* moves inside the rail portion 183*b* in the circumferential direction. When the convex portion 125*a* reaches a contact portion 184, an unillustrated click ball is pressed into the click groove portion 122 illustrated in FIG. 3B and a click feeling occurs, and the operation apparatus 100 is fixed at an attachment position (second position). At the attachment position, the convex portions 125*a* and 125*b* are engaged and held with the rail portions 183*a* and 183*b* (bayonet connection), which physically prevents separation of the operation apparatus 100 from the attachment portion 190 in a direction opposite the arrow X direction (insertion direction).

Figure 7A:
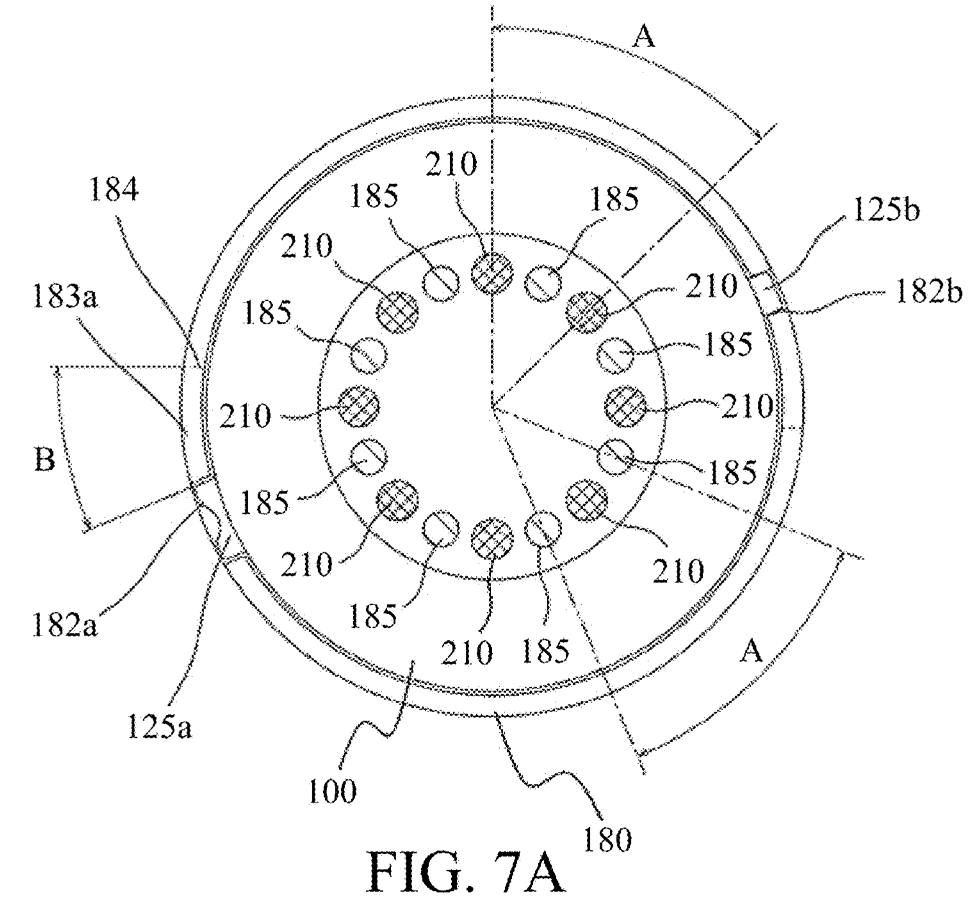
FIGS. 7A and 7B illustrate contact lands of the operation apparatus according to Example 1.
Figure 7B:
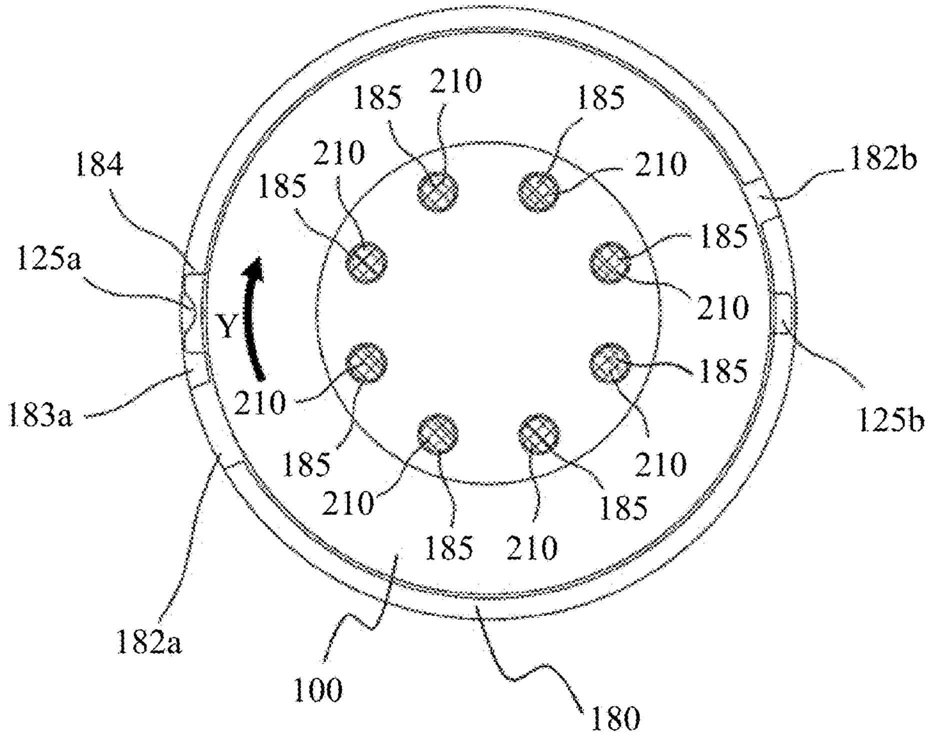

FIGS. 7A and 7B illustrate a relationship between the contact lands 210 of the operation apparatus 100 and the terminals 185 of the image pickup apparatus 1. FIG. 7A illustrates a pre-rotation state in which the operation apparatus 100 is inserted into the concave portion 181 of the top cover 180 (at the first position), and FIG. 7B illustrates a state in which the operation apparatus 100 is inserted into the top cover 180 and then rotated to the attachment position.

As described above, the contact lands 210 of the operation apparatus 100 are circumferentially arranged at regular intervals, and the arrangement interval is angle A. The terminals 185 are circumferentially arranged at regular intervals (equal pitches), and the arrangement interval (interval angle or angle pitch between adjacent terminals) is angle A.

In the state of FIG. 7A, each contact land 210 is positioned between adjacent terminals 185 and contacts none of the terminals 185. The rail portion 183*a* of the top cover 180 has a length corresponding to angle B from the opening portion 182*a* to the contact portion 184. That is, the operation apparatus 100 can be rotated by rotational angle B relative to the attachment portion 190. Angle A is larger than angle B.

In a case where the operation apparatus 100 rotates by angle B in an arrow Y direction in FIG. 7B and the convex portion 125*a* reaches the contact portion 184, the operation apparatus 100 is located at the attachment position and those corresponding to each other among the plurality of contact lands 210 and the plurality of terminals 185 simultaneously contact each other. That is, the first, second, and third contacts simultaneously contact first, second, and third terminals, respectively. The term "simultaneous" does not necessarily require strict simultaneity but may allow a slight time difference that can be regarded as simultaneous.

Since angle A is larger than angle B, a contact land 210 and a terminal 185 not corresponding to each other among the contact lands 210 and the terminals 185 do not contact each other even when the operation apparatus 100 rotates. Thus, a non-corresponding pair of a contact land 210 and a terminal 185 are prevented from contacting each other in an attachment process of the operation apparatus 100.

This example can prevent non-corresponding terminals from contacting each other in a case where the operation apparatus 100 is attached to the image pickup apparatus 1.

Example 2

Figure 8A:
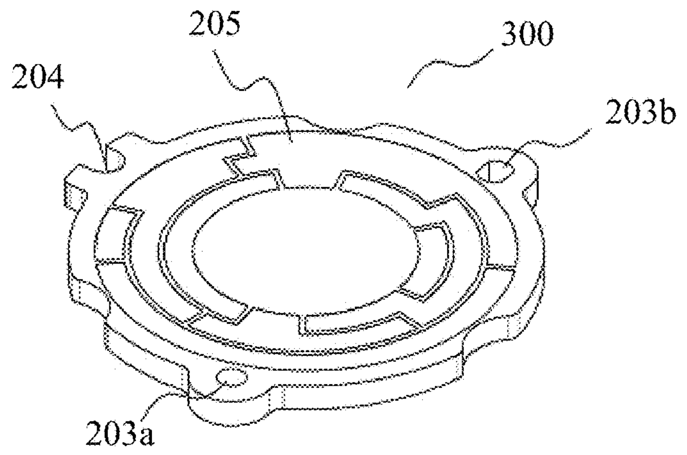
FIGS. 8A, 8B, and 8C illustrate a circuit board of an operation apparatus according to Example 2.
Figure 8B:
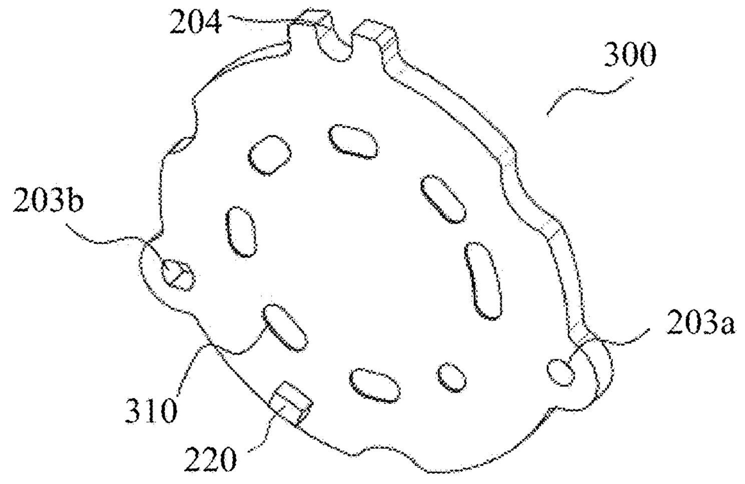
Figure 8C:
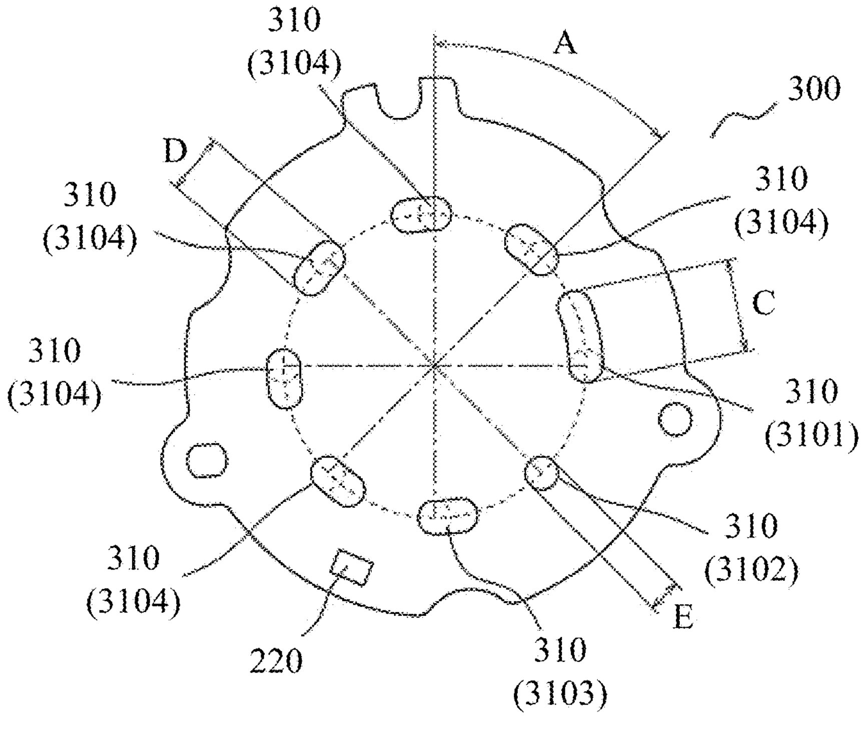

A description will now be given of Example 2. Example 2 will mainly discuss a difference from Example 1. FIGS. 8A and 8B illustrate a circuit board 300 when viewed from diagonally above (on the dial member side) and diagonally behind (on the lower cover member side), respectively. FIG. 8C illustrates the bottom surface of the circuit board 300.

Similarly to the circuit board 200 according to Example 1, the circuit board 300 is a plate wiring substrate and has a structure in which a copper foil pattern is formed on an insulating glass epoxy base material and an insulating resist is provided on the copper foil pattern. Gold plating processing is provided on the copper foil pattern exposed through openings provided at the insulating resist.

The dial pattern 205 as the exposed copper foil pattern is formed at the top surface of the circuit board 300. Similarly, a plurality of contact lands 310 as the copper foil pattern are exposed through the openings of the insulating resist at the bottom surface of the circuit board 300. Gray code is constituted by combination of contact between the plurality of connection portions of the dial pattern 205 and the two slide portions of the terminal brush 130 to be described below. The plurality of contact portions the dial pattern 205 are electrically connected in a one-to-one correspondence to the plurality of corresponding contact lands 310.

The plurality of contact lands 310 are circumferentially arranged at regular intervals at the bottom surface of the circuit board 300. The arrangement interval of the plurality of contact lands 310 is angle A as illustrated in FIG. 8C. The plurality of contact lands 310 include one GND land 3101, one power land 3102, one detection signal land 3103, and five operation signal lands 3104. The detection signal land 3103 is a land for signal outputting from the electronic component 220 mounted on the circuit board 300. The electronic component 220 receives drive power supply from the power land 2102 and outputs a signal (type information) to the detection signal land 3103. The image pickup apparatus 1 receives the signal from the detection signal land 3103 and determines the type of the operation apparatus 100.

In this example, the size of the GND land 3101, the size of the power land 3102, and the size of the detection signal land 3103 and the operation signal land 3104 are different from one another in the circumferential direction. The GND land 3101 has circumferential direction dimension C, and the detection signal land 3103 and the operation signal lands 3104 have circumferential direction dimension D. The power land 3102 has circumferential direction dimension E. These dimensions have a relationship of C>D>E.

Figure 9A:
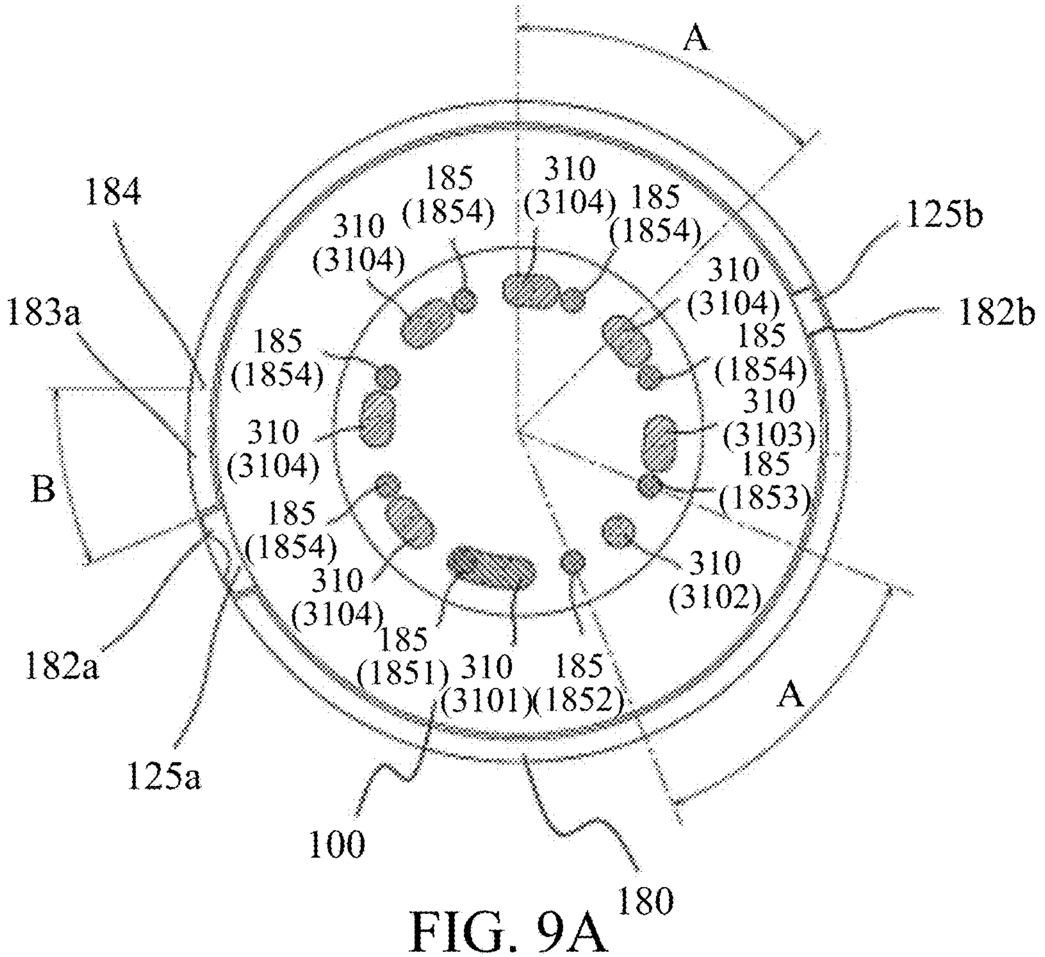
FIGS. 9A, 9B, and 9C illustrate contact lands of an operation apparatus according to Example 2.
Figure 9B:
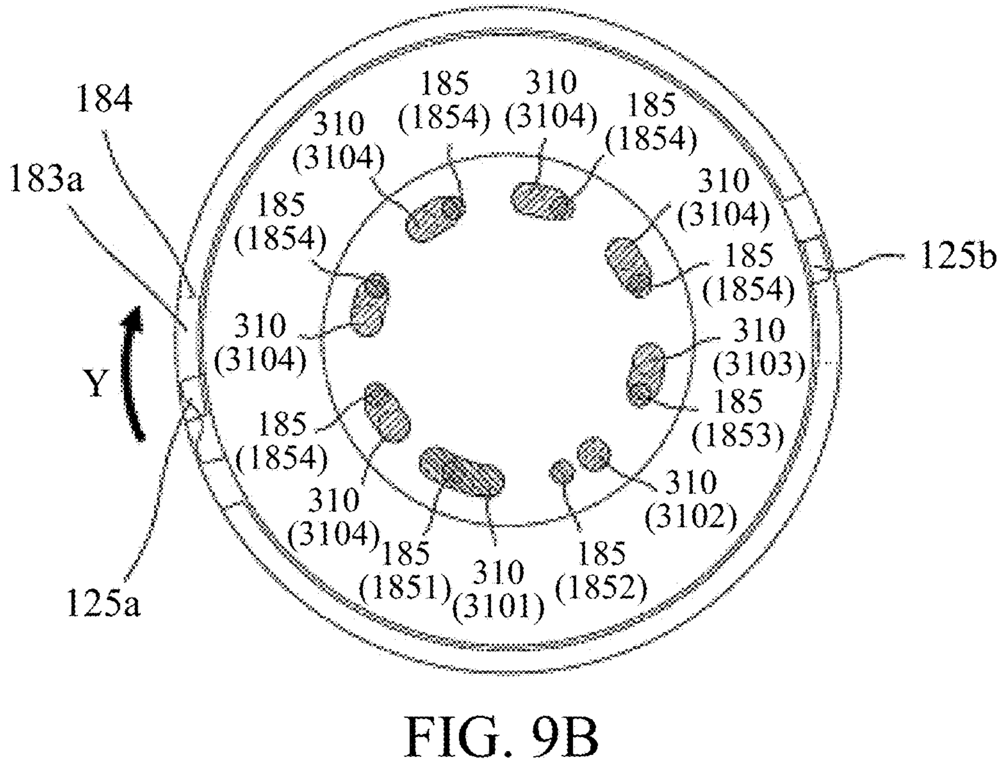
Figure 9C:
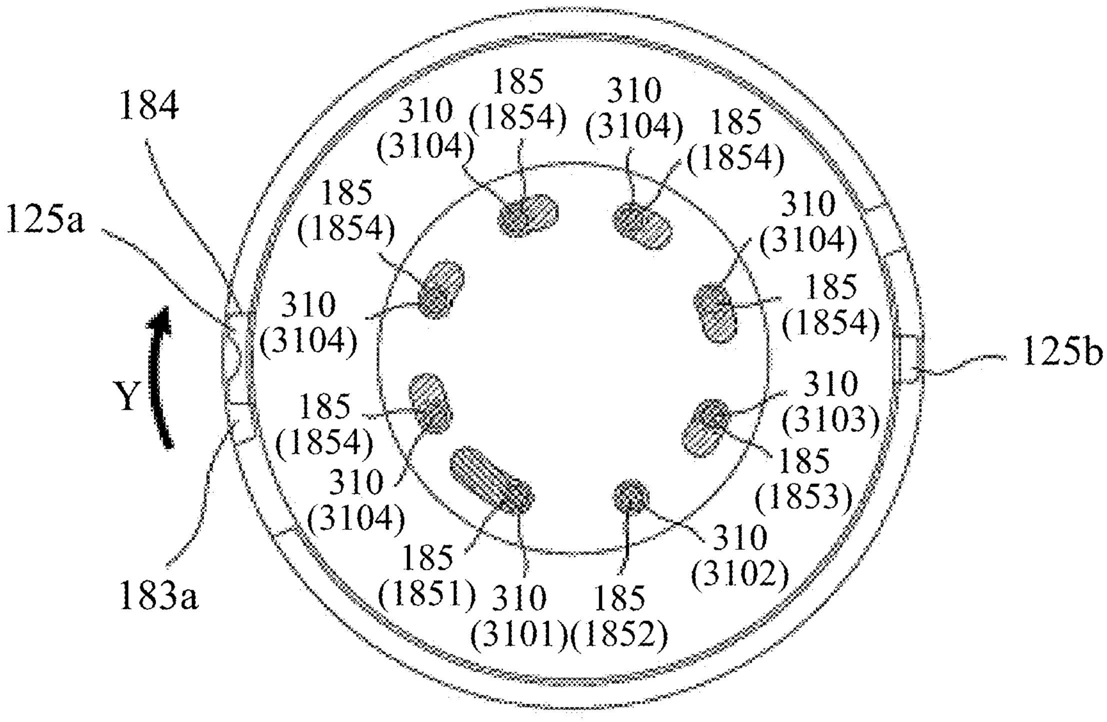

FIGS. 9A, 9B, and 9C illustrate a relationship between the contact lands 310 of the operation apparatus 100 and the terminals 185 of the image pickup apparatus 1. FIG. 9A illustrates a pre-rotation state in which the operation apparatus 100 is inserted into the top cover 180, and FIG. 9B illustrates a state in which the operation apparatus 100 is inserted into the top cover 180 and then rotated toward the attachment position (during rotation). FIG. 9C illustrates a state in which the rotated operation apparatus 100 reaches the attachment position.

As described above, the plurality of contact lands 310 are circumferentially arranged, and the arrangement interval thereof is angle A. The terminals 185 are circumferentially arranged at regular intervals, and the arrangement interval thereof is angle A.

In the state of FIG. 9A, the power land 3102, the detection signal land 3103, and the operation signal lands 3104 with dimension D or E are each positioned between terminals 185 and contact no terminals 185. On the other hand, the GND land 3101 with dimension C contacts a GND terminal 1851 among the terminals 185 and is in a GND connection state.

In this example as well, the rail portion 183*a* of the top cover 180 of the image pickup apparatus 1 has a length corresponding to angle B (>angle A) from the opening portion 182*a* to the contact portion 184.

In a case where the operation apparatus 100 rotates by an angle smaller than angle B in the arrow Y direction in FIG. 9B, the detection signal land 3103 and the operation signal lands 3104 with dimension D contact a detection signal terminal 1853 and an operation signal terminal 1854, respectively, among the terminals 185 and become electrically connected.

In a case where the operation apparatus 100 further rotates by angle B in the arrow Y direction and the convex portion 125*a* reaches the contact portion 184 as illustrated in FIG. 9C, the operation apparatus 100 is located at the attachment position. In this state, the power land 3102 with dimension E contacts a power terminal 1852 among the terminals 185 and becomes electrically connected.

Even in this example, the convex portions 125*a* and 125*b* are engaged and held with the rail portions 183*a* and 183*b*, which physically prevents detachment of the operation apparatus 100 in a direction opposite to the insertion direction of the operation apparatus 100.

Thus, in the process of rotating the operation apparatus 100 to the attachment position, this example connects the GND land 3101 to the GND terminal 1851 and then connects the detection signal land 3103 and the operation signal lands 3104 to the detection signal terminal 1853 and the operation signal terminal 1854. Finally, this example connects the power land 3102 to the power terminal 1852. Thereby, stable signal connection is achieved, and failure of communication connection with the image pickup apparatus 1 in attaching the operation apparatus 100 can be prevented.

Example 3

Figure 10A:
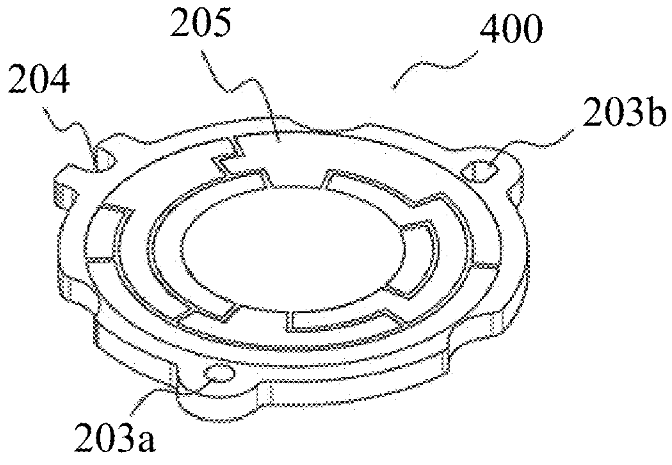
FIGS. 10A, 10B, and 10C illustrate a circuit board of an operation apparatus according to Example 3.
Figure 10B:
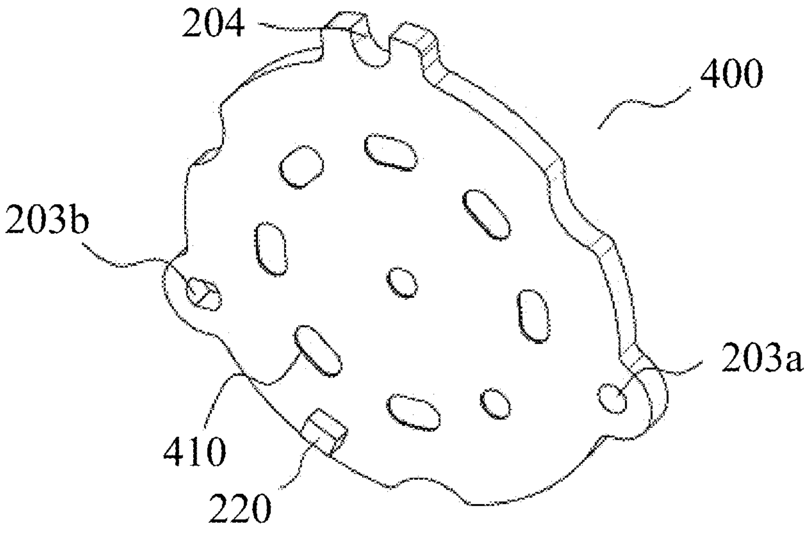
Figure 10C:
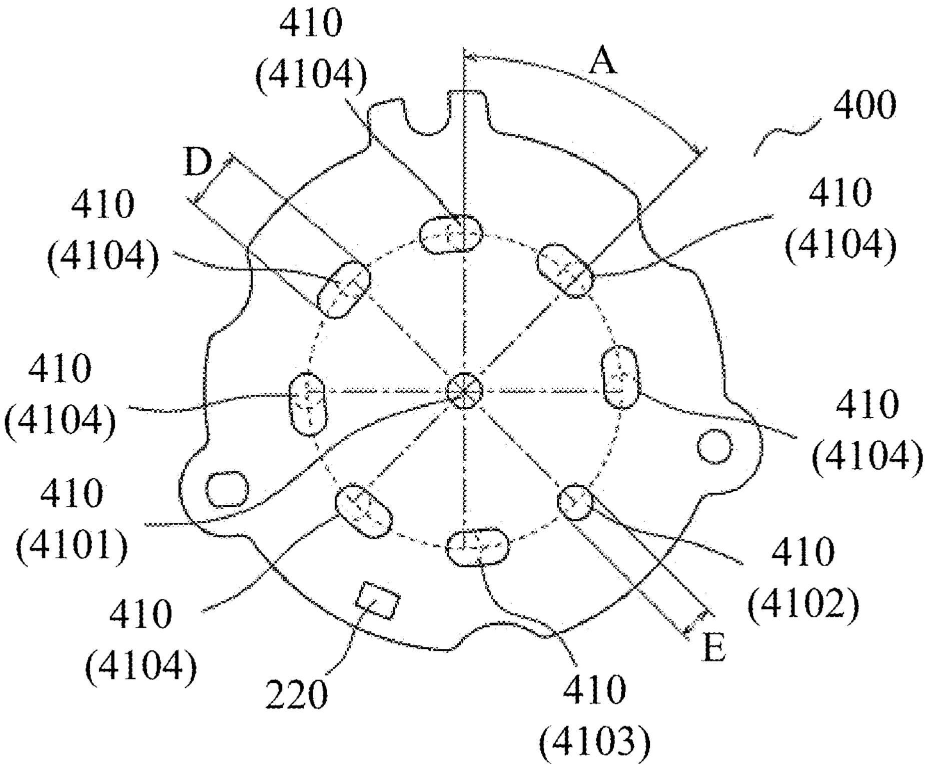

A description will now be given of Example 3. Example 3 will discuss mainly differences from Examples 1 and 2. FIGS. 10A and 10B illustrate a circuit board 400 when viewed from diagonally above (on the dial member side) and diagonally behind (on the lower cover member side), respectively. FIG. 10C illustrates the bottom surface of the circuit board 400.

Similarly to the circuit boards 200 and 300 according to Examples 1 and 2, the circuit board 400 is a plate wiring substrate and has a structure in which a copper foil pattern is formed on an insulating glass epoxy base material and an insulating resist is provided on the copper foil pattern. Gold plating processing is provided on the copper foil pattern exposed through openings provided at the insulating resist.

The dial pattern 205 as the exposed copper foil pattern is formed at the top surface of the circuit board 400. Similarly, a plurality of contact lands 410 as the copper foil pattern are exposed through the openings of the insulating resist at the bottom surface of the circuit board 400. Gray code is constituted by combination of contact between the plurality of connection portions of the dial pattern 205 and the two slide portions of the terminal brush 130 to be described below. The plurality of contact portions the dial pattern 205 are electrically connected in a one-to-one correspondence to the plurality of corresponding contact lands 410.

The operation apparatus 100 according to this example includes, as the contact lands 410 disposed at the bottom surface of the circuit board 400, a plurality of contact lands circumferentially arranged at regular intervals and one contact land positioned at the arrangement center thereof. The arrangement interval of the contact lands 410 on the circumference is angle A as illustrated in FIG. 10C. The plurality of contact lands 410 include one GND land 4101 disposed at the center, one power land 4102 disposed on the circumference, one detection signal land 4103, and five operation signal lands 4104. The detection signal land 4103 is a land for signal outputting from the electronic component 220 mounted on the circuit board 400. The electronic component 220 receives drive power supply from the power land 4102 and outputs a signal (type information) to the detection signal land 4103. The image pickup apparatus 1 receives the signal from the detection signal land 4103 and determines the type of the operation apparatus 100.

In this example, the size of the power land 4102 and the size of the detection signal land 4103 and the operation signal lands 4104 are different from each other in the circumferential direction. The detection signal land 4103 and the operation signal lands 4104 have circumferential direction dimension D, and the power land 4102 has circumferential direction dimension E. These dimensions have a relationship of D>E.

Figure 11A:
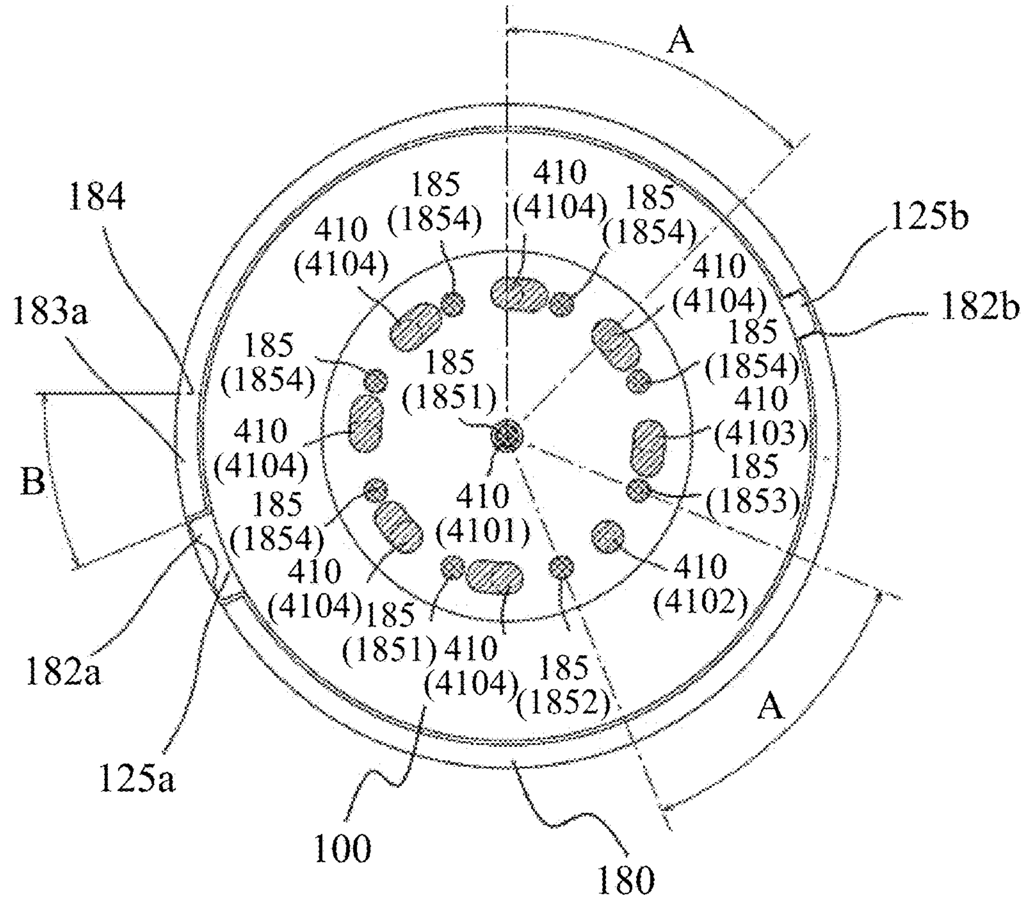
FIGS. 11A, 11B, and 11C illustrate contact lands of the operation apparatus according to Example 3.
Figure 11B:
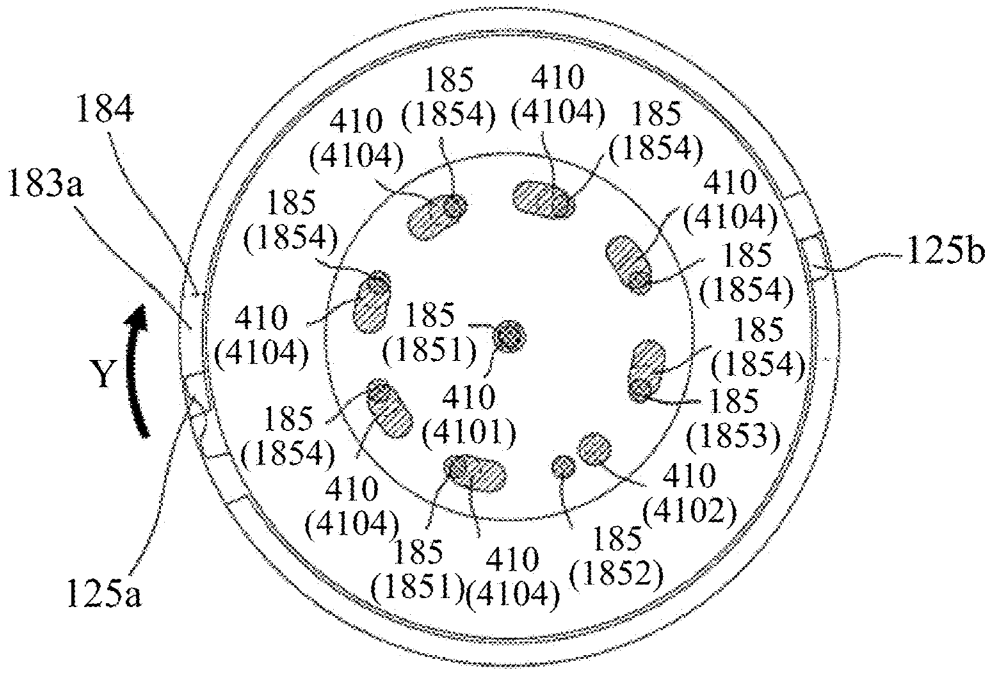
Figure 11C:
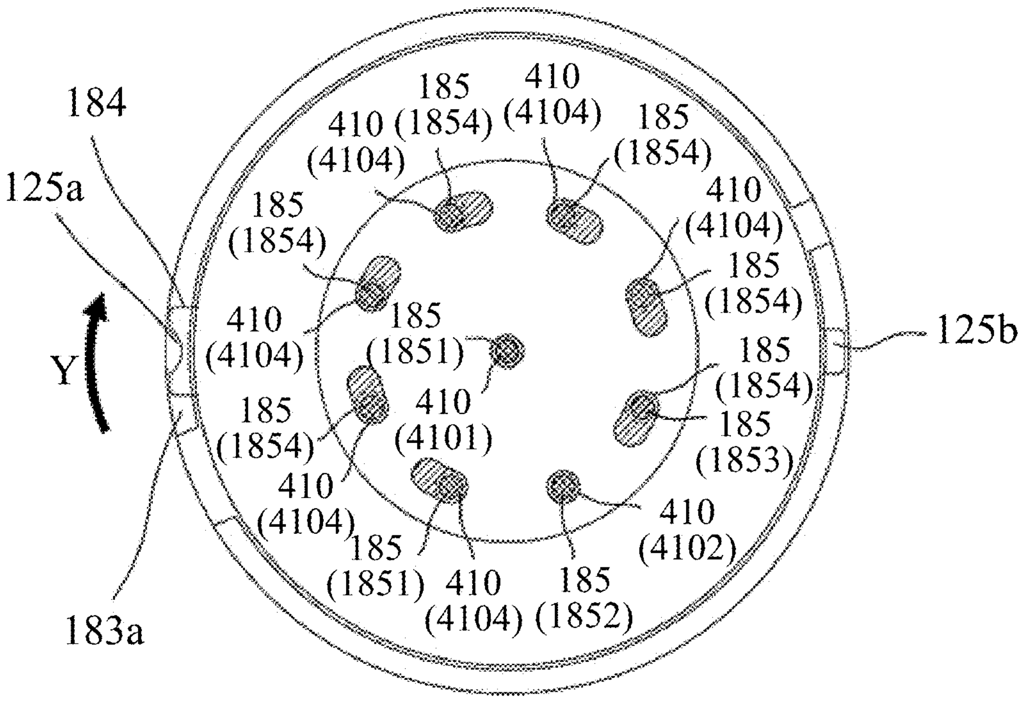

FIGS. 11A, 11B, and 11C illustrate a relationship between the contact lands 410 of the operation apparatus 100 and the terminals 185 of the image pickup apparatus 1. FIG. 11A illustrates a pre-rotation state in which the operation apparatus 100 is inserted into the top cover 180, and FIG. 11B illustrates a state in which the operation apparatus 100 is inserted into the top cover 180 and then rotated toward the attachment position (during rotation). FIG. 11C illustrates a state in which the rotated operation apparatus 100 reaches the attachment position.

As described above, one of the plurality of contact lands 410 is disposed at the center whereas the others are circumferentially disposed, and the arrangement interval of the contact lands 410 on the circumference is angle A. Similarly, one of the terminals 185 is disposed at the center and the others are circumferentially arranged at regular intervals, and the arrangement interval of the terminals 185 on the circumference is angle A.

In the state of FIG. 11A, the power land 4102, the detection signal land 4103, and the operation signal lands 4104 with dimension D or E are each positioned between terminals 185 on the circumference and contact no terminals 185. On the other hand, the GND land 4101 disposed at the center contacts the GND terminal 1851 disposed at the center among the terminals 185 and is in a GND connection state.

In a case where the operation apparatus 100 rotates by an angle smaller than angle B in the arrow Y direction in FIG. 11B, the detection signal land 4103 and the operation signal lands 4104 with dimension D contact the detection signal terminal 1853 and the operation signal terminal 1854, respectively, among the terminals 185 and become electrically connected.

In a case where the operation apparatus 100 further rotates by angle B in the arrow Y direction and the convex portion 125*a* reaches the contact portion 184 as illustrated in FIG. 11C, the operation apparatus 100 is at the attachment position. In this state, the power land 4102 with dimension E contacts the power terminal 1852 among the terminals 185 and becomes electrically connected.

Even in this example, the convex portions 125*a* and 125*b* are engaged and held with the rail portions 183*a* and 183*b*, which physically prevents detachment of the operation apparatus 100 in the direction opposite the insertion direction of the operation apparatus 100.

In this example as described above, in the process of attaching the operation apparatus 100, the GND land 4101 is connected to the GND terminal 1851 and then the detection signal land 4103 and the operation signal lands 4104 are connected to the detection signal terminal 1853 and the operation signal terminal 1854. Lastly, the power land 4102 is connected to the power terminal 1852. Accordingly, stable signal connection is possible, and failure of communication connection with the image pickup apparatus 1 when the operation apparatus 100 is attached can be prevented.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can prevent connection between a non-corresponding pair of a contact and a terminal in attaching an accessory to an electronic apparatus.

This application claims priority to Japanese Patent Application No. 2023-096310, which was filed on Jun. 12, 2023, and which is hereby incorporated by reference herein in its entirety.

What is claimed is:

1. An accessory that is attached to and detachable from an attachment portion provided to an electronic apparatus, the accessory comprising:

an engagement portion configured to engage the accessory with the attachment portion to hold the accessory in a case where the accessory disposed at a first position relative to the attachment portion is rotated to a second position in a first direction; and a plurality of contacts arranged in the first direction and connectable to corresponding terminals among a plurality of terminals arranged in the first direction and provided to the attachment portion at the second position, wherein an interval angle between adjacent contacts among the plurality of contacts is larger than a rotational angle of the accessory from the first position to the second position, wherein the attachment portion includes a first terminal for grounding at an arrangement center of the plurality of terminals, wherein the accessory includes a first contact for grounding at an arrangement center of the plurality of contacts, wherein the plurality of contacts include a second contact connectable to a second terminal for power supply among the plurality of terminals, and a third contact connectable to a third terminal for signal transmissions among the plurality of terminals, wherein at the first position, the first contact is connected to the first terminal and each of the second contact and the third contact is connected to none of the plurality of terminals, wherein while the accessory is rotated from the first position to at the second position, the third contact is first connected to the third terminal, and the second contact is then connected to the second terminal, and wherein in the first direction, the third contact is longer than the second contact.

2. The accessory according to claim 1, wherein the plurality of contacts include a first contact connectable to a first terminal for grounding among the plurality of terminals, a second contact connectable to a second terminal for power supply among the plurality of terminals, and a third contact connectable to a third terminal for signal transmissions among the plurality of terminals, wherein at the first position, each of the first contact, the second contact, and the third contact is connected to none of the plurality of terminals, and wherein in a case where the accessory is rotated from the first position to the second position, the first contact, the second contact, and the third contact are simultaneously connected to the first terminal, the second terminal, and the third terminal, respectively.

3. The accessory according to claim 1, wherein the plurality of contacts include a first contact connectable to a first terminal for grounding among the plurality of terminals, a second contact connectable to a second terminal for power supply among the plurality of terminals, and a third contact connectable to a third terminal for signal transmissions among the plurality of terminals, wherein at the first position, each of the first contact, the second contact, and the third contact is connected to none of the plurality of terminals, and wherein while the accessory is rotated from the first position to the second position, the first contact is first connected to the first terminal, the third contact is next connected to the third terminal, and then the second contact is connected to the second terminal.

4. The accessory according to claim 3, wherein in the first direction, the first contact is longer than the third contact, and the third contact is longer than the second contact.

5. The accessory according to claim 1, wherein the plurality of contacts include two or more contacts for signal transmissions, wherein the accessory includes a dial member rotationally operable in the first direction, and wherein signals according to a rotational position of the dial member are output from the contacts for the signal transmissions.

6. An electronic apparatus comprising:

an attachment portion attachable to and detachable from an accessory;

a holder configured to engage the accessory with the attachment portion to hold the accessory in a case where the accessory disposed at a first position relative to the attachment portion is rotated to a second position in a first direction; and a plurality of terminals arranged in the first direction and connectable to corresponding contacts among the plurality of contacts at the second position, wherein an interval angle between adjacent terminals among the plurality of terminals is larger than a rotational angle of the accessory from the first position to the second position, wherein the attachment portion includes a first terminal for grounding at an arrangement center of the plurality of terminals, wherein the accessory includes a first contact for grounding at an arrangement center of the plurality of contacts, wherein the plurality of terminals include a second terminal connectable to a second contact for power supply among the plurality of contacts, and a third terminal connectable to a third contact for signal transmissions among the plurality of contacts, wherein when the accessory is located at the first position, the first terminal is connected to the first contact and each of the second terminal and the third terminal is connected to none of the plurality of contacts, wherein while the accessory is rotated from the first position to the second position, the third terminal is first connected to the third contact, and the second terminal is then connected to the second contact and wherein in the first direction, the third contact is longer than the second contact.

* * * * *